US010122442B2

(12) United States Patent
Jacobs et al.

(10) Patent No.: US 10,122,442 B2
(45) Date of Patent: Nov. 6, 2018

(54) DETERMINATION OF CONSTELLATION IMPAIRMENT PARAMETERS VIA ERROR-VECTOR MAGNITUDE MINIMIZATION

(71) Applicant: Tektronix, Inc., Beaverton, OR (US)

(72) Inventors: Steven A. Jacobs, Madison, WI (US); Robert A. Marsland, Jr., Madison, WI (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 15/614,394

(22) Filed: Jun. 5, 2017

(65) Prior Publication Data

US 2017/0359120 A1     Dec. 14, 2017

Related U.S. Application Data

(60) Provisional application No. 62/347,727, filed on Jun. 9, 2016.

(51) Int. Cl.
*H04B 10/00* (2013.01)
*H04B 10/079* (2013.01)
*H04J 14/00* (2006.01)

(52) U.S. Cl.
CPC ............... *H04B 10/0795* (2013.01)

(58) Field of Classification Search
CPC .... H04B 10/07; H04B 10/075; H04B 10/079; H04B 10/0795; H04B 10/07953
See application file for complete search history.

(56) References Cited

U.S. PATENT DOCUMENTS

2013/0303098 A1* 11/2013 Carlsson ............ H04B 17/0042
455/226.1
2015/0124911 A1* 5/2015 Wicker, Jr. .......... H04L 25/0242
375/340

OTHER PUBLICATIONS

Extended European Search Report issued in European Patent Application No. 17175320.5, dated Sep. 19, 2017, 10 pages.
Halder et al., "Low-Cost Alternate EVM Test for Wireless Receiver Systems," Proceedings. 23rd IEEE VLSI Test Symposium, 2005, pp. 255-260.

(Continued)

*Primary Examiner* — Daniel Dobson
(74) *Attorney, Agent, or Firm* — Miller Nash Graham & Dunn; Andrew J. Harrington

(57) ABSTRACT

A test and measurement system is disclosed. The system includes a data store with a data description of a received in-phase (I) quadrature (Q) symbol. The received IQ symbol is received from a transmitter associated with impairments, and the received IQ symbol is modified from a corresponding ideal IQ symbol by the impairments. A computer processor is coupled to the data store and generates an Error-Vector Magnitude (EVM) function that describes a difference between the received IQ symbol and the ideal IQ symbol in terms of a plurality of impairment parameters indicating the impairments. The processor then determines values for the impairment parameters that quantify the impairments. The values are determined by selection of values for the impairment parameters that minimize the EVM function.

20 Claims, 8 Drawing Sheets

(56) References Cited

OTHER PUBLICATIONS

Kastritis, "Algorithm development for the blind signal to noise ratio estimation in dynamic optical networks," Diploma Thesis, NTUA, Retrieved from the internet: http://artemis-new.cslab.ece.ntua.gr:8080/jspui/bitstream/123456789/6634/1/DT2013-0068.pdf, May 16, 2013, 77 pages.

Godard, "Self-Recovering Equalization and Carrier Tracking in Two-Dimensional Data Communication System," IEEE Transactions on Communications, vol. COM-28, No. 11, Nov. 1980, pp. 1867-1875.

Butzer et al., "The Shannon Sampling Series and the Reconstruction of Signals in Terms of Linear, Quadratic and Cubic Splines," Siam J. Appl. Math., vol. 46, No. 2, Apr. 1986, pp. 299-323.

Ries, "On the reconstruction of signals by a finite number of samples," Signal Processing, vol. 23, Issue 1, Apr. 1991, pp. 45-68.

Tsallis et al., "Generalized simulated annealing," Physica A: Statistical Mechanics and its Applications, vol. 233, Issues 1-2, Nov. 15, 1996, pp. 395-406.

Dekkers, et al., "Global optimization and simulated annealing," Mathematical Programming, vol. 50, Issue 1-3, Mar. 1991, pp. 367-393.

Nam et al., "n-Dimensional Cauchy Neighbor Generation for the Fast Simulated Annealing," IEICE Trans. Inf. & Syst., vol. E87-D, No. 11, Nov. 2004, pp. 2499-2502.

Viterbi et al., "Nonlinear Estimation of PSK-Modulated Carrier Phase with Application to Burst Digital Transmission," IEEE Transactions on Information Theory, vol. IT-29, No. 4, Jul. 1983, pp. 543-551.

* cited by examiner

DETERMINATION OF CONSTELLATION IMPAIRMENT PARAMETERS VIA ERROR-VECTOR MAGNITUDE MINIMIZATION

CROSS-REFERENCES TO RELATED APPLICATIONS

The present application claims benefit from U.S. Provisional Patent Application Ser. No. 62/347,727, filed Jun. 9, 2016, and entitled "Numerical Optimization For Evaluating And Correcting Constellation Impairments," which is incorporated herein by reference as if reproduced in its entirety.

FIELD OF THE INVENTION

This disclosure is directed to systems and methods associated with aspects of a test and measurement system, and, more particularly, to systems and methods for determining communication impairments to a communication system.

BACKGROUND

Test and measurement systems are designed to receive and interpret signals from a device under test (DUT). Such testing may support troubleshooting errors and/or confirming proper operation of the DUT. As an example, a DUT may be configured to communicate via an optical medium. Such optical communication may involve modulation of an optical carrier to create an optical signal. The optical signal may then be communicated across the medium for interpretation by a remote receiver. However, an optical signal may not perfectly propagate across the medium due to various physical limitations called impairments. In order to interpret the optical signal upon receipt, the receiver may be required to account for the impairments to reconstruct the original signal. A DUT may be employed to test proper operation of the transmitter and/or receiver as well as assist in determining the impairments on an optical communication system.

Examples in the disclosure address these and other issues.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

Figure 1:
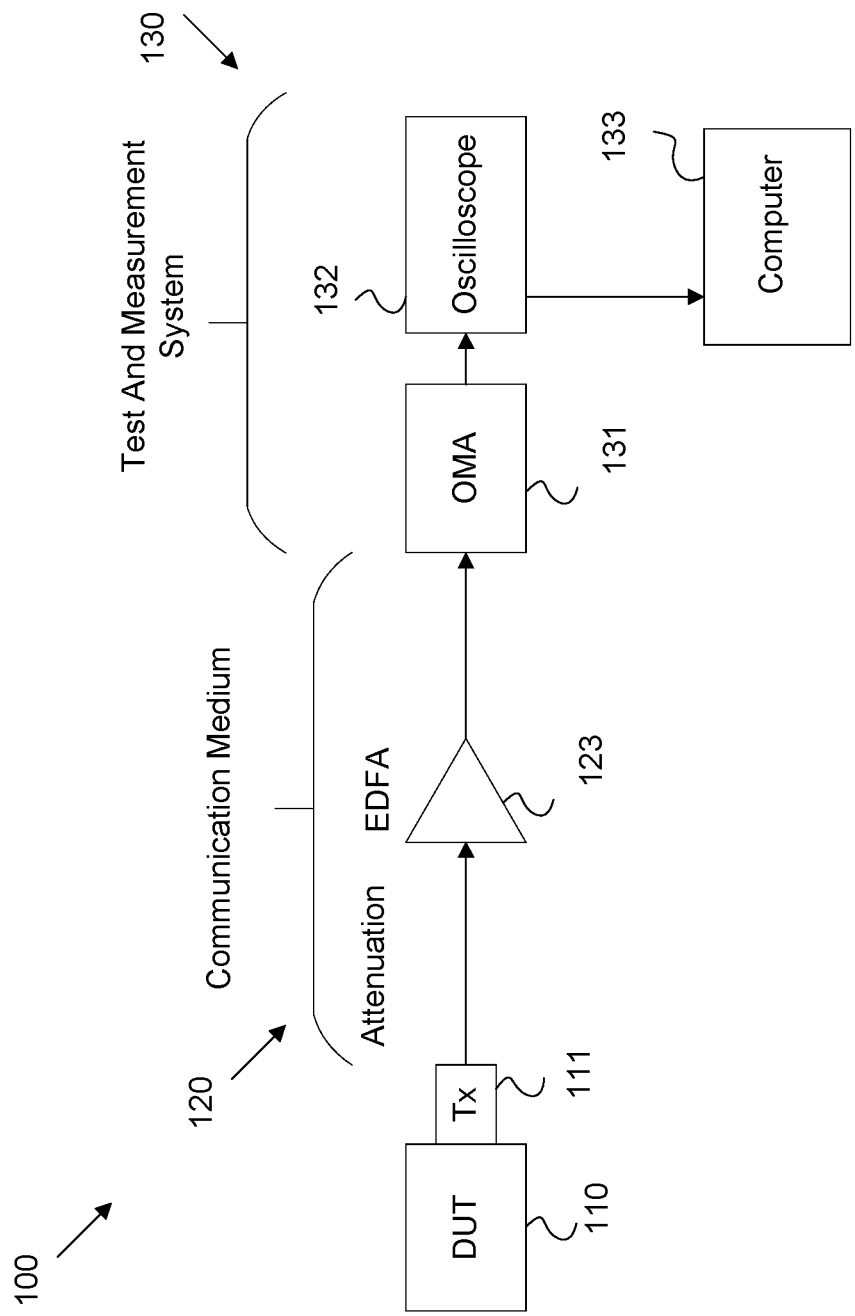
FIG. 1 is a block diagram of an example test network for determination of communication impairments.

In some examples, in-phase (I) quadrature (Q) symbols (IQ symbols) may be modulated onto an optical carrier according to QAM and/or QPSK modulation formats. Such IQ symbols may then be communicated across a medium, such as an optical cable. An ideal IQ symbol transmitted from a DUT is modified by the impairments during propagation across the medium, resulting in a real received symbol. Impairments for optical communications may be determined and then employed to reconstruct the ideal IQ symbol. Such impairments may be computed in a sequential manner. For example, a clock frequency and a phase may be evaluated. This data may be employed so that the received data may be sampled at symbol center times. Polarization demultiplexing may then be performed to reverse impairments related to polarization rotation induced by transmission through the medium. A carrier phase may then be removed, leaving the transmitted IQ symbol constellation. Further, constellation impairments introduced by the transmitter, such as IQ DC offsets, IQ gain imbalance, and I-Q phase error, may then be evaluated for each polarization to verify that such impairments are within acceptable limits. In some instances, the impairments may interact with each other. As such, a sequential impairment computation process may reduce the accuracy of impairment measurements in later stages of the computation.

Disclosed herein is mechanism for determining such impairment parameters concurrently (e.g. not sequentially as discussed above). One or more IQ symbols are first received via the medium associated with the impairments and stored. In one example, a blind Error Vector Magnitude (EVM) function is employed for evaluating impairments. The EVM function quantifies the disagreement between the received symbols and the intended symbols. The EVM function describes the impairments in terms of unknown impairment parameters. The EVM function may be considered blind as the ideal value of the IQ symbols is unknown to the receiver. The blind EVM function is then graphed. The minimum value of the blind EVM function is then determined. The minimum value of the blind EVM function then concurrently provides the correct values for the impairments. That is, the correct values for the impairments are those that minimize the disagreement between the received symbols and the intended symbols. The blind EVM function may include sub-equations for the impairment parameters that are either unsolvable or contain dis-continuous partial derivatives. For such impairments, the values are determined according to a numerical mechanism (e.g. graphed and minimized). However, impairments that are solvable and contain continuous derivatives may be solved analytically, for example by employing gradient based minimization techniques. In such a case, such impairment values may be solved analytically during blind EVM function minimization. By solving at least some impairment values analytically during blind EVM function formulation, the resulting blind EVM function is simplified. This simplifies the process of minimizing the blind EVM function, and hence reduces processing time. Such simplification may also improve the accuracy and reliability of the minimization process.

FIG. 1 is a block diagram of an example test network 100 for determination of communication impairments. The test network 100 may include a DUT 110 with a transmitter (Tx) 111 coupled to a communication medium 120. When testing impairments related to the Tx 111 and/or the communication medium, the test network 100 includes a test and measurement system 130 to test signals that would be received by a receiver (Rx). The test and measurement system 130 may include an optical modulation analyzer (OMA) 131, an oscilloscope 132, and/or a computer 133.

The DUT 110 may be any device to be tested by test network 100. For example, the DUT 110 may be a device configured to transmit data to a corresponding receiver. The DUT 110 contains a Tx 111 that transmits data from the DUT 110. The Tx 111 may be designed to correspond to the communication medium 120 employed. For example, the Tx 111 may be an optical transmitter including an optical source, such as a laser, to generate an optical carrier wave. The Tx 111 may also include modulation equipment capable of modulating a signal onto the optical carrier to create an optical signal. For example, the Tx 111 may include a waveguide with a refraction index controllable by application of electro-magnetic signals. As such, the DUT 110 and Tx 111 can generate an optical signal for transmission across the communication medium. It should be noted that, while the present disclosure generally discusses EVM function minimization in terms of optical signals and equipment, the techniques may also be applied to wired electrical and/or wireless signals. As such, the Tx 111 may be a wireless transmitter and/or an electrical transmitter in some examples. In either case, the Tx 111 may be associated with impairments.

For example, the Tx 111 may be employed to communicate data via IQ symbols by employing a quadrature based communication scheme, such as QPSK, QAM16, etc. In such a case, the impairment parameters may include in-phase gain ($S_I$), quadrature gain ($S_Q$), in-phase direct current (DC) offset ($\mu_I$), quadrature DC offset ($\mu_Q$), and IQ phase angle ($\theta$). Further, the Tx 111 may simultaneously transmit a pair of signals, one in the horizontal plane known as a x polarization signal, and one in the vertical plane known as a y polarization signal. As such, the Tx 111 may include a set of parameters for the x polarization and a separate set of impairment parameters for the y polarization. For clarity, it should be noted that all variables disclosed herein that include a superscript of x refer to the x polarization only, that include a superscript of y refer to the y polarization only, and that include a superscript of (x,y) refer to both polarizations. Also, variables with a subscript of I refer to the in-phase portion of a signal, while variables with a subscript of Q refer to the quadrature portion of the signal. Further, IQ symbols may be transmitted in timeslots. The variable k is employed herein to refer to a specified timeslot. Based on the foregoing, an ideal IQ symbol transmitted from Tx 111 may be completely described in according to $I_k^{(x)}+iQ_k^{(x)}$ and $I_k^{(y)}+iQ_k^{(y)}$, where $I_k^{(x)}$ indicates the in-phase portion of the x polarization at a timeslot k, $iQ_k^{(x)}$ indicates the quadrature portion of the x polarization at the timeslot k, $I_k^{(y)}$ indicates the in-phase portion of the y polarization at the timeslot k, and $iQ_k^{(y)}$ indicates the quadrature portion of the y polarization at the timeslot k, respectively. Based on the foregoing, the impairment parameters for a Tx 111 can be described according to Equation 1 below:

$$\begin{pmatrix} T_k^{(x)} \\ T_k^{(y)} \end{pmatrix} = \begin{pmatrix} S_I^{(x)}(I_k^{(x)} - \mu_I^{(x)}) + e^{i\theta(x)} S_Q^{(x)}(Q_k^{(x)} - \mu_Q^{(x)}) \\ S_I^{(y)}(I_k^{(y)} - \mu_I^{(y)}) + e^{i\theta(y)} S_Q^{(y)}(Q_k^{(y)} - \mu_Q^{(y)}) \end{pmatrix} \quad \text{Equation 1}$$

where $T_k^{(x)}$ and $T_k^{(y)}$ indicate the actual transmitted signal at a timeslot k for the x and y polarization, respectively, $S_I^{(x)}$ and $S_I^{(y)}$ indicate the in-phase gain for the x and y polarization, respectively, $S_Q^{(x)}$ and $S_Q^{(y)}$ indicate the quadrature gain for the x and y polarization, respectively, $I_k^{(x)}$ and $I_k^{(y)}$ indicate the ideal in-phase symbol at timeslot k for the x and y polarization, respectively, $Q_k^{(x)}$ and $Q_k^{(y)}$ indicate the ideal quadrature symbol at timeslot k for the x and y polarization, respectively, $\mu_I^{(x)}$ and $\mu_I^{(y)}$ indicate the in-phase DC offset for the x and y polarization, respectively, $\mu_Q^{(x)}$ and $\mu_Q^{(y)}$ indicate the quadrature DC offset for the x and y polarization, respectively, and $e^{i\theta(x)}$ and $e^{i\theta(y)}$ indicate an imaginary portion of the signal as modified by the phase angle for the x and y polarization, respectively.

Upon leaving the Tx 111 the signal is communicated via communication medium 120. In the optical case, the communication medium 120 may include an optical fiber made of a clear material such as glass. The communication medium 120 may also include an Erbium-doped fiber amplifier (EDFA) 123, which is an optical repeater device configured to boost the intensity of optical signals carried through a fiber optic system. A communication medium 120 may be associated with additional impairments, such as chromatic dispersion and polarization mode dispersion (PMD). As such, the fiber employed for communication medium 120 may be selected as a short length fiber (e.g. eight meters or less). A short length of fiber may be associated with negligible amounts of chromatic dispersion and PMD, which allows the test and measurement system 130 to better isolate the transmitter impairments during testing. It should be noted that, for the electrical and/or wireless cases, the communication medium 120 may instead include an electrical cable and/or a wireless air gap. In the case of an optical signal, the actual IQ symbols received at the test and measurement system 130 may be described according to Equations 2-3 below:

$$\begin{pmatrix} Z_k^{(x)} \\ Z_k^{(y)} \end{pmatrix} = \exp(-2\pi i \nu t_k - i\phi) U \begin{pmatrix} T_k^{(x)} \\ T_k^{(y)} \end{pmatrix}, \quad \text{Equation 2}$$

where $Z_k^{(x)}$ and $Z_k^{(y)}$ indicate the actual received IQ signal at timeslot k for the x and y polarization, respectively, $\nu$ indicates the heterodyne frequency, $t_k$ indicates the center of timeslot k, $\phi$ indicates an optical phase impairment of the communication medium 120, and U is a unitary matrix representing polarization rotation induced by the communication medium 120 on the transmitted signal $T_k^{(x)}$ and $T_k^{(y)}$ as discussed in connection with Equation 1. The unitary matrix is expressed by Equation 3 below:

$$U = \begin{pmatrix} e^{i\eta_1}\cos\tau & -e^{i\eta_2}\sin\tau \\ e^{-i\eta_2}\sin\tau & e^{-i\eta_1}\cos\tau \end{pmatrix}, \quad \text{Equation 3}$$

where $\tau$, $\eta_1$, and $\eta_2$ indicate angles of the polarization rotation impairment that characterize the communication medium.

The test and measurement system 130 is coupled to the communication medium 120. The test and measurement system 130 receives the signals, samples them to obtain the IQ symbols, and determines the impairments. The system 130 may then employ the impairments to correct the received IQ symbols to obtain the ideal IQ symbol from the DUT 110. The test and measurement system 130 may include an OMA 131. The OMA 131 is an opto-electrical device that so converts an optical signal into an electrical signal for further analysis. The output from the OMA 131 is forwarded to an oscilloscope 132. The oscilloscope 132 is an electronic test instrument that processes and/or displays electrical signals. For example, the oscilloscope 132 may sample the electrical output from the OMA 131 to create a digital signal. The oscilloscope 132 may also perform signal conditioning, clock recovery, etc. Further, the oscilloscope 132 may apply frequency transforms, such as FFT, to convert the signal into the frequency domain as desired. The oscilloscope 132 may display the sampled waveform. The oscilloscope 132 may also store data representing the sampled waveform and forward such data to a computer 133. The computer 133 may be a general purpose computer. The computer 133 may operate specialized software components to perform advanced computations on the data received, for example to support determination of the impairments.

The computer 133 may receive samples of the IQ symbols and store them in a data store. Hence, the data store may include a data description of one or more received in-phase IQ symbol(s). As discussed above, the received IQ symbol(s) are received from a Tx 111 and a communication medium 120 that are associated with various impairments. Hence, the received IQ symbol modified from a corresponding ideal IQ symbol (e.g. generated by the DUT 110) by the impairments. The computer 133 may employ a processor, coupled to the data store, to generate an Error-Vector Magnitude (EVM) function that describes a difference between the received IQ symbol and the ideal IQ symbol in terms of a plurality of impairment parameters indicating the impairments. For example, the EVM function may be generated by employing the impairments as described in Equations 1-3. The computer 133 may then minimize the EVM function to determine values for the impairment parameters that quantify the impairments. In other words, the values for the impairment parameters may be determined by selection of values for the impairment parameters that minimize the EVM function.

As noted above, the EVM function may be generated as a blind EVM function. Specifically, the blind EVM function is generated without information indicating value(s) of the ideal IQ symbol(s) transmitted by Tx 111. The EVM function may contain data indicating impairments of the Tx 111, and may also contain data indicating impairments of the communication medium 120. For example, the received IQ symbol may be received via a communication medium 120 including an optical fiber. In such a case, the impairments determined by minimization of the EVM function may be further associated with the communication medium 120 and hence the optical fiber. Example formulations and minimization mechanisms for the EVM function are discussed in more detail below.

In one example, the blind EVM function may be generally expressed by Equation 4 below:

$$EVM_B = \sqrt{\frac{1}{2}\left[(EVM_B^{(x)})^2 + (EVM_B^{(y)})^2\right]}, \quad \text{Equation 4}$$

where $EVM_B$ indicates the blind EVM function in terms of x polarization and y polarization, as $EVM_B^{(x)}$ and $EVM_B^{(y)}$, respectively. For many communication systems, the IQ symbols may form a square QAM constellation, in which the symbols may be normalized so that the largest symbol is assigned a magnitude of unity. With a square QAM constellation having M distinct symbols, the ideal constellation points are $\pm a_j \pm i a_m$, where $a_j$, $a_m$ ($1 \le j$, $m \le \frac{1}{2}M^{1/2} \equiv M_R$) are real and positive, and any combination of + and is allowed. For a communication system employing a square QAM constellation, the x and y components $EVM_B^{(x)}$ and $EVM_B^{(y)}$ of the blind EVM may be expressed by Equation 5 below:

$$EVM_B^{(x,y)} = \left\{\frac{1}{N}\sum_{k=1}^{N}\left[\min_{1 \le j \le M_R}(I_k^{(x,y)} \pm a_j)^2 + \min_{1 \le m \le M_R}(Q_k^{(x,y)} \pm a_m)^2\right]\right\}^{1/2}, \quad \text{Equation 5}$$

where $EVM_B^{(x,y)}$ indicates a root-mean-square difference between a series of received IQ symbols (e.g. as received at the test and measurement system 130) and the closest-match IQ symbols (e.g. as generated by a DUT 110) from the constellation x polarizations and y polarizations, N indicates a number of IQ symbols considered, k indicates a time slot of the corresponding IQ symbol, $I_k^{(x,y)}$ is an I portion of the ideal IQ symbol for x polarizations and y polarizations, $a_j$ is one of the possible values for the I portion of the constellation, $Q_k^{(x,y)}$ is a Q portion of the ideal IQ symbol for x polarizations and y polarizations, and $a_m$ is one of the possible values for the Q portion of the constellation. Minima for the blind EVM function may be attained when the ±signs for $a_j$ and $a_m$ are opposite of the sign of $I_k^{(x,y)}$ or $Q_k^{(x,y)}$, respectively. Hence Equation 5 can be restated as Equation 6 below:

$$EVM_B^{(x,y)} = \left\{\frac{1}{N}\sum_{k=1}^{N}\left[\min_{1 \le j \le M_R}(|I_k^{(x,y)}| - a_j)^2 + \min_{1 \le m \le M_R}(|Q_k^{(x,y)}| - a_m)^2\right]\right\}^{1/2}, \quad \text{Equation 6}$$

where all variables are as discussed above. Hence, the computer 133 may minimize the blind EVM function described by Equation 6 to determine values for impairment parameters by employing $I_k^{(x,y)}$ and $Q_k^{(x,y)}$ as discussed with respect to Equations 1-3 above.

For example, Equation 6 may be computed by employing $I_k^{(x,y)}$ and $Q_k^{(x,y)}$ as defined in terms of corresponding impairments as described below by Equations 7-8:

$$I_k^{(x,y)} = \mu_I^{(x,y)} - (A_k^{(x,y)} \cos \tau + B_k^{(x,y)} \sin \tau)/(S_I^{(x,y)} \sin \theta^{(x,y)}), \quad \text{Equation 7}$$

where $\mu_I^{(x,y)}$ is a direct current (DC) offset of an I portion of the received IQ symbol for x polarizations and y polarizations, $A_k^{(x,y)}$ and $B_k^{(x,y)}$ describe correlations between the impairment parameters, $\tau$ indicates a polarization rotation impairment caused by a communication medium, $S_I^{(x,y)}$ indicates I gain of the received IQ symbol, and $\theta$ indicates an IQ phase angle of the received IQ symbol; and $$Q_k^{(x,y)} = \mu_Q^{(x,y)} + (C_k^{(x,y)} \cos \tau + D_k^{(x,y)} \sin \tau)/(S_Q^{(x,y)} \sin \theta^{(x,y)}), \quad \text{Equation 8}$$

where $\mu_Q^{(x,y)}$ is a direct current (DC) offset of a Q portion of the received IQ symbol for x polarizations and y polarizations, $C_k^{(x,y)}$ and $D_k^{(x,y)}$ describe correlations between the impairment parameters, $\tau$ indicates polarization rotation impairment caused by a communication medium, $S_Q^{(x,y)}$ indicates Q gain of the received IQ symbol, and $\theta$ indicates an IQ phase angle of the received IQ symbol.

Equations 7-8 may be further expanded by employing descriptions of the correlations between impairment parameters in terms of $A_k^{(x,y)}$, $B_k^{(x,y)}$, $C_k^{(x,y)}$ and $D_k^{(x,y)}$ according to Equations 9-12 below:

$$A_k^{(x,y)} = Z_{kr}^{(x,y)} \sin\{(k-1)\psi + \phi \mp \eta_1 - \theta^{(x,y)}\} + Z_{ki}^{(x,y)} \cos\{(k-1)\psi + \phi \mp \eta_1 - \theta^{(x,y)}\},$$

$$B_k^{(x,y)} = \pm Z_{kr}^{(y,x)} \sin\{(k-1)\psi + \phi \pm \eta_2 - \theta^{(x,y)}\} \pm Z_{ki}^{(y,x)} \cos\{(k-1)\psi + \phi \pm \eta_2 - \theta^{(x,y)}\},$$

$$C_k^{(x,y)} = Z_{kr}^{(x,y)} \sin\{(k-1)\psi + \phi \mp \eta_1\} + Z_{ki}^{(x,y)} \cos\{(k-1)\psi + \phi \mp \eta_1\}, \text{ and}$$

$$D_k^{(x,y)} = \pm Z_{kr}^{(y,x)} \sin\{(k-1)\psi + \phi \pm \eta_2\} \pm Z_{ki}^{(y,x)} \cos\{(k-1)\psi + \phi \pm \eta_2\}, \quad \text{Equations 9-12}$$

where $Z_{kr}^{(x,y)}$ indicates the real part of received symbol data, $Z_{ki}^{(x,y)}$ indicates imaginary part of received symbol data, $\psi$ indicates a heterodyne frequency parameter employed to determine a heterodyne frequency impairment (v), $\phi$ indicates an optical phase impairment, and $\eta 1$ and $\eta 2$ indicate polarization rotation impairments caused by the communication medium. It should be noted that the heterodyne frequency parameter can be determined according to:

$$\psi = 2\pi v P \quad \text{Equations 13}$$

where P indicates a symbol period (e.g. the inverse of the baud rate).

By employing the blind EVM function of Equation 6 in conjunction with Equations 7-13 and supporting sampled data from the data store, the computer 133 can determine a large number of potential EVM values based on a large number of potential impairment parameter values. Further, Equations 6-12 may not be directly solvable to obtain specific impairment parameter values. However, the blind EVM function may be minimized by selecting impairment parameter values that result in the minimum blind EVM function value. Such impairment parameter values have been experimentally determined to be the correct values for the impairments as shown in detail below. Minimization may be accomplished numerically by employing a non-gradient based minimizing process, for example MATLAB function fminsearch. It should be noted that in some instances, employing a non-gradient based function may result in determining a local minimum instead of a global minimum. As such, a generalized simulated annealing (GSA) minimization procedure may be employed to minimize the EVM function while avoiding local minima. Other minimizing procedures that avoid local minima could be used in place of GSA. It should also be noted that, in some cases, one or more impairment values may be determined via an analytical computation to simplify the minimization of the EVM function via a numerical computation.

Figure 2:
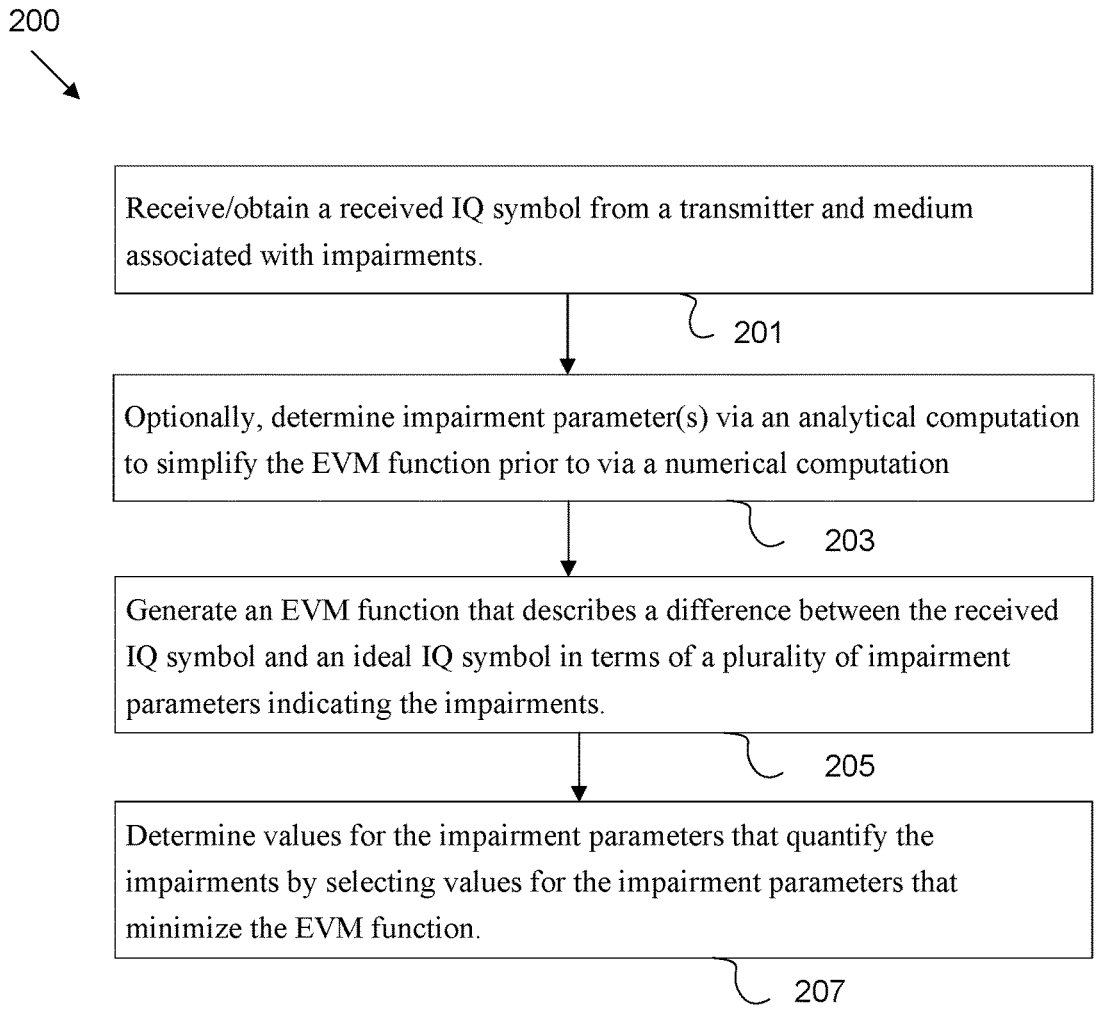
FIG. 2 is a flowchart of an example method for determining impairment parameters by minimizing an Error-Vector Magnitude (EVM) function.

FIG. 2 is a flowchart of an example method 200 for determining impairment parameters by minimizing an EVM function, for example by employing a test network such as test network 100 and/or a computer 133. At block 201, one or more received IQ symbols are obtained, for example from memory and/or from an oscilloscope. The received IQ symbol(s) are received from a transmitter associated with impairments. The received IQ symbols are also received via a medium (e.g. fiber optic cable, air gap, electric cable, etc.) associated with additional impairments. The IQ symbol(s) are generated as corresponding ideal IQ symbol(s), but are modified by the impairments during transit, resulting in the received IQ symbol.

At block 203, any solvable impairment values are determined via analytical computations. This has the effect of simplifying the EVM function and hence simplifies the process of minimizing the EVM function via a numerical computation. As impairment values may not be solvable, block 203 is optional. For example, an impairment value may be solved when derivative function(s) of the EVM with respect to the impairment value are continuous. An example of such simplification of Equations 1-13, in the optical case, is discussed in detail below. As such, any of Equations 16-86 may be employed as part of method 200.

At block 205, an EVM function is generated to describe a difference between the received IQ symbol(s) and the ideal IQ symbol(s) in terms of a plurality of impairment parameters indicating the impairments. As noted above, the EVM function may be generated as a blind EVM function without information indicating values of the ideal IQ symbol(s). As an example, the EVM function may be generated as a blind EVM function for an optical communication by employing Equations 1-13 as described above. The EVM function may also be generated by employing a simplified EVM function as discussed in detail below.

At block 207, the EVM function is minimized. In other words, values for the impairment parameters that quantify the impairments are determined, for example by numerical non-gradient mechanism. The values may be determined by selecting values for the impairment parameters that minimize the EVM function. By minimizing the EVM function, the values for the impairment parameters may be determined concurrently and may not be determined sequentially. The EVM function may be minimized by avoiding local minima. For example, a GSA minimization procedure may be employed to minimize the EVM function while avoiding local minima. It should be noted that generating and minimizing an EVM function according to method 200 and/or test network 100 may be relatively slow. As such, generating and minimizing an EVM function may be employed to test the accuracy of other, faster mechanisms employed to recover IQ symbols/constellations when impairments are present.

An example mechanism for EVM minimization may be as follows. As noted above, the blind EVM function may be a continuous function of the medium and transmitter parameters. However, due to the presence of the possibly non-continuous minimum function ("min") in the EVM function's definition, the EVM function may not have continuous partial derivatives. In such a case, the minimization mechanism to be employed may not be gradient-based. A multivariate minimization function that is not gradient based may be employed for minimization. For example, a MATLAB fminsearch function may be employed for such a purpose. This function performs minimization using a Nelder-Mead simplex mechanism. This approach may only require a starting point for the minimization process. It should be noted that the EVM functions discussed above (e.g. Equations 4-6) include various local minima, for example associated with the heterodyne frequency parameter $\psi$. In the event that starting point is closer to a local minima that the global minimum, the fminsearch may converge to a sub-optimal local minimum.

Figure 3:
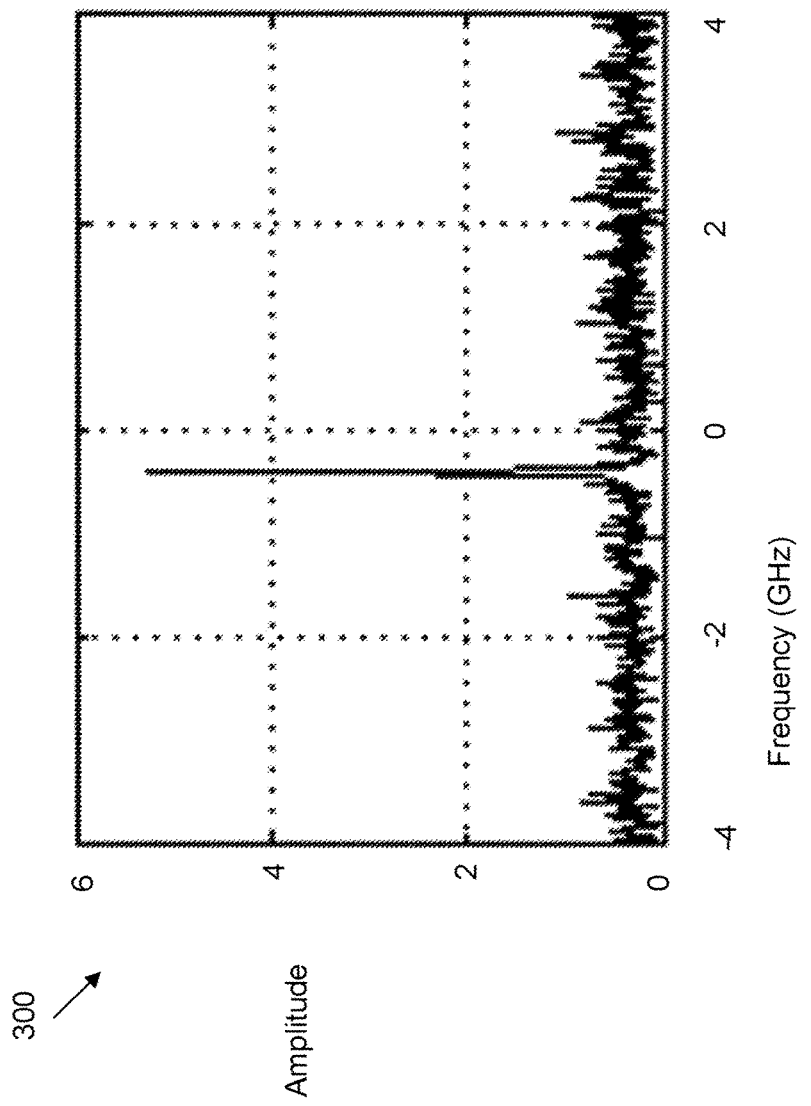
FIG. 3 is a graph of data indicating a heterodyne frequency of an example system as obtained from Quadrature Phase Shift Keying (QPSK) symbols.
Figure 4:
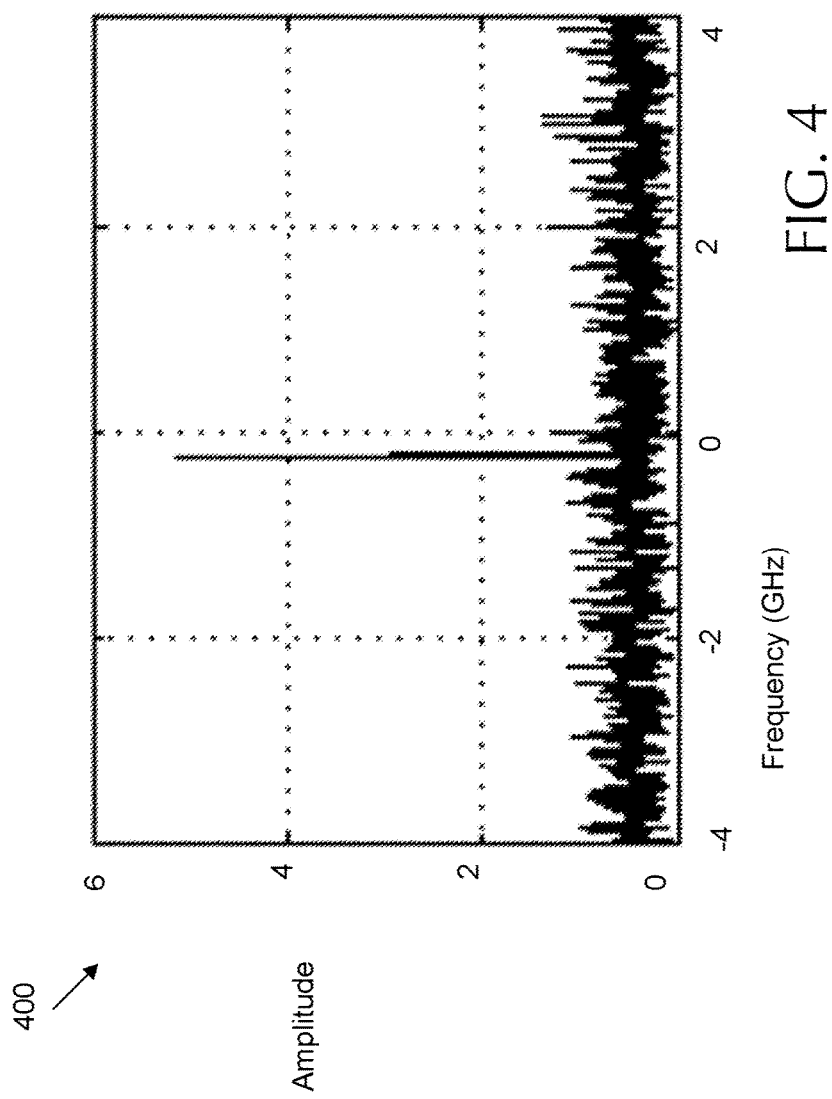
FIG. 4 is a graph of data indicating a heterodyne frequency of an example system as obtained from Quadrature amplitude modulation base sixteen (QAM16) symbols.

To obtain a beneficial starting point value for $\psi$, modulation in the x polarized symbol data may be removed, for example by taking the fourth power of the IQ symbol data. The FFT of the fourth power of the data may be determined. The frequency that produces the largest FFT component may then be obtained. Such frequency may then be divided by four to obtain the approximate corresponding heterodyne frequency in the IQ symbol data. FIGS. 3-4 show an example of obtaining the approximate starting point value by such a mechanism.

FIG. 3 is a graph 300 of data indicating a heterodyne frequency of an example system as obtained from QPSK symbols. FIG. 4 is a graph 400 of data indicating a heterodyne frequency of an example system as obtained from (QAM16) symbols. Graphs 300 and 400 each illustrate the FFT of the fourth power of the associated x polarized symbol data. The amplitude is depicted along the vertical axis and the frequencies are depicted along the horizontal axis. As shown, a clear amplitude spike in each case indicates the approximate heterodyne frequency. In the examples shown, the amplitude spike indicates the heterodyne frequency occurs at approximately thirty two gigaHertz (GHz). It should be noted that the initial heterodyne frequency obtained in this manner, denoted herein as $v_0$, may be within about fifty megahertz (MHz) of the frequency that minimizes the blind IF-EVM function. This initial heterodyne frequency may be obtained using all the symbol data. In other words, the initial heterodyne frequency may be evaluated prior to the EVM minimization process.

As noted above, a GSA minimization procedure can be employed to support obtaining approximate starting values for the impairment parameters. An example minimization procedure is described, in C. Tsallis and D. Stariolo, "Generalized simulated annealing," Physica A 233, 395-406 (1996), which is incorporated herein by reference. Such a global minimization procedure may avoid minimization converging to a local minimum. After employing GSA, the starting values for the medium and transmitter impairment parameters may be updated by employing a one dimensional visiting distribution, characterized by the parameter $q_V$. For example, the GSA may employ a $q_V$ parameter of about 1.7. Further, an acceptance probability parameter ($q_A$) may also be employed and set to about zero. In addition, upper and lower bounds may be imposed on the parameters. For example, if a new value for a parameter provided by the visiting distribution is outside of these bounds, the visiting distribution may be called again until a value within the bounds is obtained. The upper and lower bounds may be set according to $2\pi(v_0 \pm \Delta v)P$ for the heterodyne frequency parameter, where $v_0$ is the starting heterodyne frequency parameter, P is a symbol period, and $\Delta v$ is a range for the actual heterodyne frequency. It should be noted that $\Delta v$ may be determined according to $\min\{4/(NP), 50\text{ MHz}\}$, where $1/NP$ is the frequency spacing in the FFT used to obtain $v_0$. Upper and lower bounds of $\pm 90°$ may be employed for other recovery parameters (e.g. $\phi$, $\tau$, $\eta_1$, $\eta_2$). For example, the bounds for the transmitter parameters may be set as follows: the bounds for the IQ phase parameter for x and y polarizations $\theta^{(x,y)}$ may be set as between sixty and one hundred twenty degrees; the bounds for the DC offset for the I and Q components in the x y polarizations $\mu_{I,Q}^{(x,y)}$ may be set between $-0.1$ and $0.1$; and the bounds for the I and Q gains for the x and y polarizations $S_{I,Q}^{(x,y)}$ and may be set between $-\frac{1}{2}\sigma^{(x,y)}$ and $2\sigma^{(x,y)}$ where $\sigma$ is defined according to Equation 14 below.

$$\sigma^{(x,y)} = \sqrt{\frac{1}{N}\sum_{k=1}^{N} |Z_k^{(x,y)}|^2} \qquad \text{Equation 14}$$

where $\sigma^{(x,y)}$ indicates gain boundaries for x and y polarizations, $Z_k^{(x,y)}$ indicates actual received IQ signal at timeslot k for x and y polarizations, and N indicates a number of IQ symbols considered. It should be noted that the boundaries listed above are exemplary and operate well on example transmitter hardware. However, such boundaries may be adjusted when performance outside such boundaries is expected.

Figure 5:
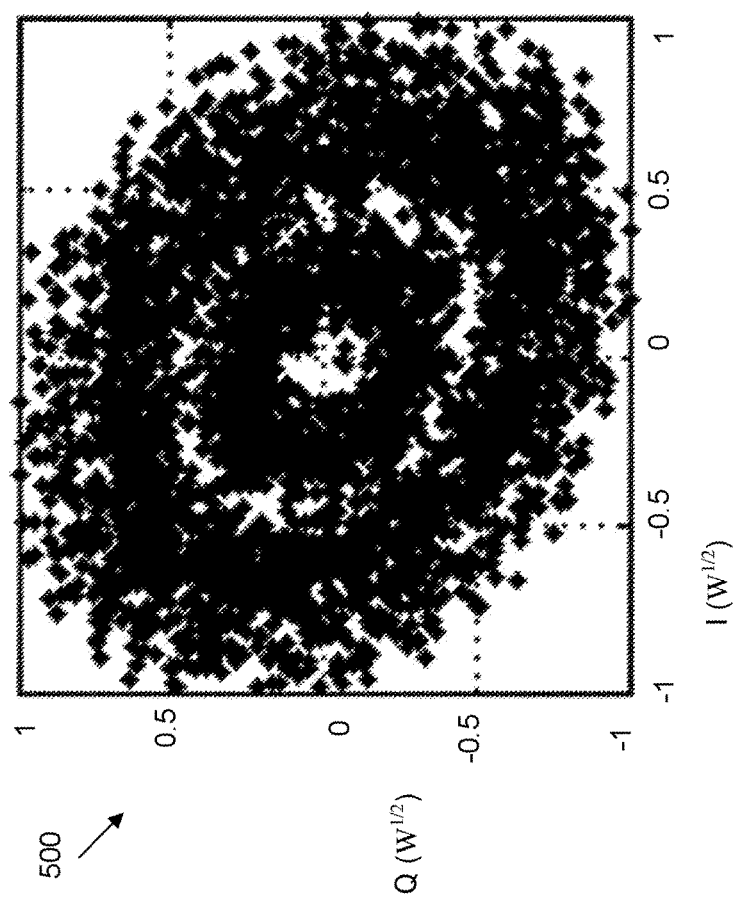
FIGS. 5-6 are graphs of time lapse data illustrating example distorted QAM16 constellations at a local minima of a blind EVM function.
Figure 6:
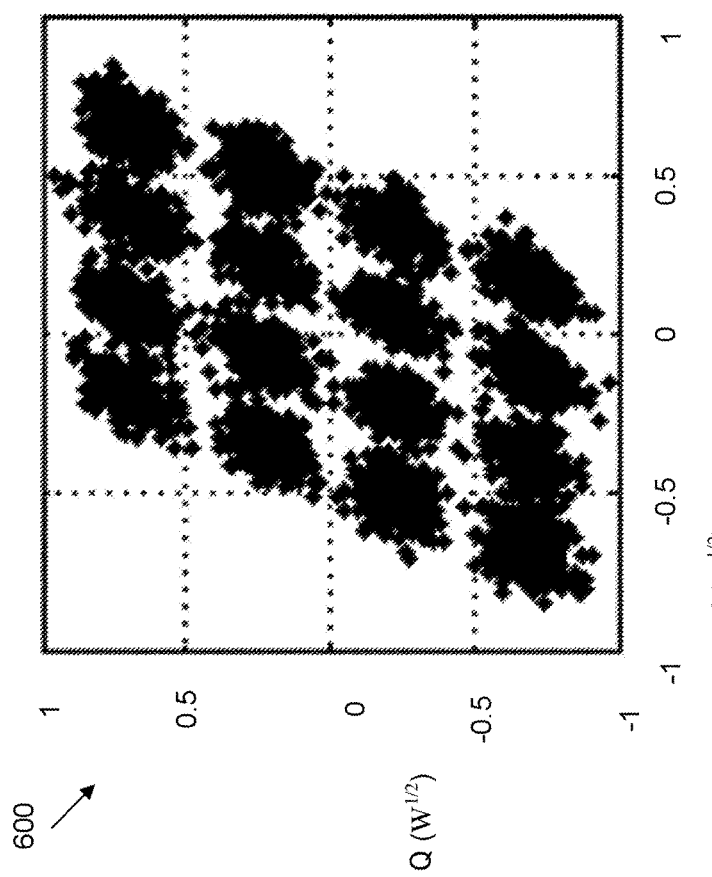
Figure 7:
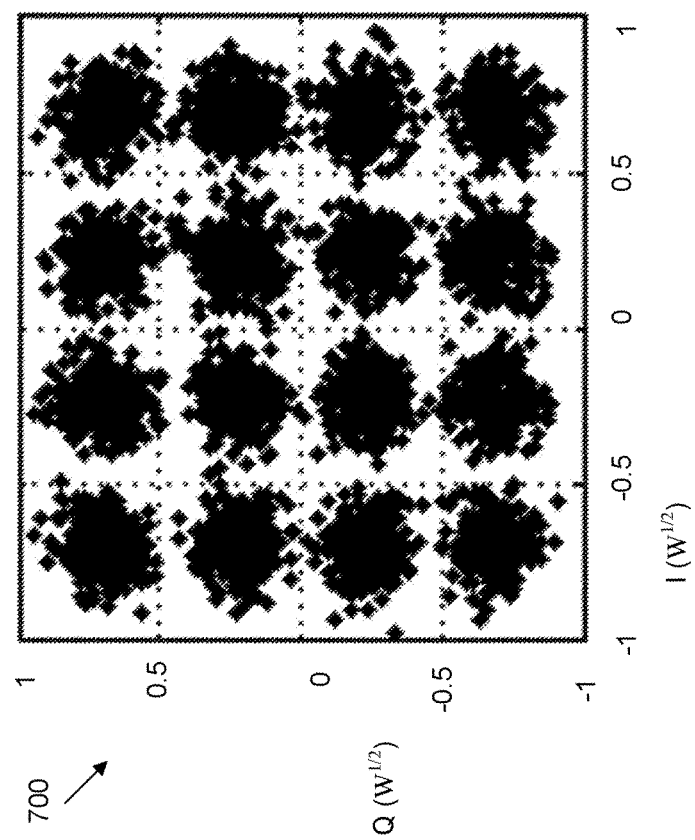
FIG. 7 is a graph of time lapse data illustrating an example of correct QAM16 constellations at a global minima of a blind EVM function.

The GSA process may be continued until a point in the multi-dimensional parameter space is obtained with $EVM_B^{(x,y)} < E_0$, where $E_0$ is an adjustable EVM threshold. For optimal performance, $E_0$ may be set below the level reached by the deepest sub-optimal local minimum of the blind EVM function. This approach causes the starting point for fminsearch to be selected in the region of attraction of the global minimum. Because detailed information regarding the local minima of the blind EVM may not be available, experimentation may be employed to inform selection for $E_0$. If $E_0$ is set too high, GSA terminates with a starting point that is not close enough to the global minimum, which may cause fminsearch to converge to a sub-optimal local minimum. Such a condition can be detected by examining the resulting constellation, which is grossly distorted in such a case. FIGS. 5-6 are graphs 500 and 600, respectively, of time lapse data illustrating example distorted QAM16 constellations at a local minima of a blind EVM function. FIG. 7 is a graph 700 of time lapse data illustrating an example of correct QAM16 constellations at a global minima of a blind EVM function. Graphs 500, 600, and 700 illustrate Q data in the vertical axis and I data in the horizontal axis. As shown, determining correct impairment parameters when minimizing the EVM function to a global minimum results in the square constellation shown by graph 700. However, determining incorrect impairment parameters due to minimization of the EVM function at a local minima result in a non-square constellation as depicted in graphs 500 and 600.

It should also be noted that setting $E_0$ too low may result in increased processing time spent in GSA, which may be a substantially slower process than fminsearch. As such, optimum efficiency may be obtained by employing the largest value of $E_0$ that consistently produces distortion-free constellations on multiple sets of data after blind EVM minimization. In order to determine an optimal value of $E_0$ for a corresponding test network, $E_0$ may be initially set to a large value (e.g. $E_0 = 0.4$). The resulting constellations may then be obtained by employing blind EVM minimization for multiple sets of data. If the data results in distortion free constellations (e.g. as shown in graph 700), then the value of $E_0$ is maintained. If distortions are present, then $E_0$ may be reduced and test again until distortion-free constellations are consistently obtained. For example, for QPSK data a value of $E_0 = 0.3$ may suffice. Further, for QAM16 data, a value of $E_0 = 0.13$ may be employed. It should be noted that increasingly complex modulation formats employ deeper local minima, which may require further reduction in $E_0$.

To mitigate the effect of laser phase noise, a data set of N symbols may be broken up into blocks according to Equation 15 below:

$$N_b = \lceil P_b/P \rceil \qquad \text{Equation 15}$$

where $N_b$ is the number of symbols per block, P is a symbol period, and $P_b$ is a selected block duration. The block duration may be selected to be below a coherence time of the system lasers. Results from individual blocks may be averaged to provide results for the data set. For example, $P_b$ may be selected as a value between about 70 MHz and about 30 MHz. GSA may be performed only for the first block of IQ symbol data. The resulting parameters may then be employed as the starting point for the fminsearch function. For subsequent blocks, the optimized parameters from the previous block may be employed as the starting point (e.g. with the exception of $\psi$ and $\phi$). Because of the time-dependent laser phase noise, $\psi$ and $\phi$ may vary from block to block. Hence, a small-scale random search over $\psi$ and $\phi$ may be performed. For example, 500 pairs of values of $\psi$ and φ may be generated, and randomly and uniformly distributed between their upper and lower bounds. The blind EVM may then be evaluated for each pair. In this search, upper and lower bounds may be selected for ψ as $\psi_{prev} \pm 2\pi P \times 10$ MHz, where $\psi_{prev}$ is the optimizing value of ψ from the previous block and P is a symbol period. The upper and lower bounds for φ may remain at ±90 degrees (°). The values for these two parameters resulting in the lowest blind EVM in this search may be employed with the other optimized parameters from the preceding block of data as the starting point for fminsearch. The convergence tolerances for this minimization function may be set by a user. A tolerance of $10^{-6}$ may be employed for the relative change in the parameter vector between iterations. Further, a tolerance of $10^{-8}$ may be employed for the relative change in the value of the blind EVM. In other words, fminsearch may be configured to terminate when an iteration results in a relative change in the parameter vector below $10^{-6}$ and a relative change in the EVM below $10^{-8}$, respectively. In addition, to assure convergence, fminsearch may be called a second time starting from a suspected minimum value.

Figure 8:
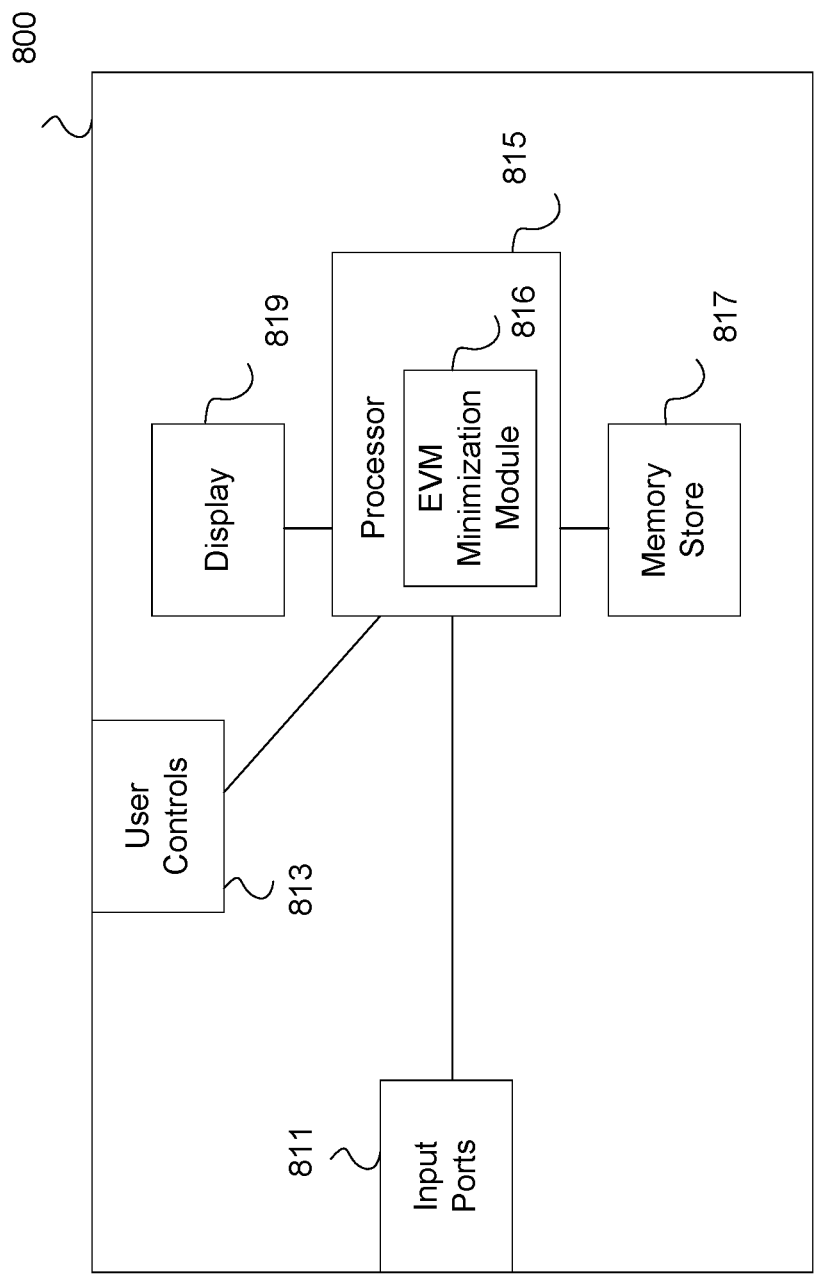
FIG. 8 is a block diagram of an example device for implementing a test and measurement system.

FIG. 8 is a block diagram of an example device 800 for implementing a test and measurement system, such as test and measurement system 130 and/or 133. Further, device 800 may be employed implement method 200, and/or any other method/procedure disclosed herein, by generating and minimizing an EVM function to determine test system impairments. Device 800 comprises input ports 811 which may be any electrical and/or optical ports, transmitters, receivers, etc. configured to receive IQ symbol data, for example from an oscilloscope. Input ports 811 may be coupled to memory store 817, and may forward IQ symbol data to memory for further processing. A processor 815 may be coupled to memory store 817 and/or input ports 811. The processor 815 is configured to execute instructions from memory store 817 and perform any methods and/or associated steps indicated by the instructions. The processor 815 may be implemented as a general purpose processor, an application specific integrated circuit (ASIC), a digital signal processor (DSP), a field programmable gate array (FPGA), etc. Memory store 817 may be implemented as processor cache, random access memory (RAM), read only memory (ROM), solid state memory, hard disk drive(s), or any other memory type. Memory store 817 acts as a non-transitory medium for storing data, computer program products, and other instructions, and providing such data/products/instruction to the processor 815 for computation as needed.

The processor 815 may comprise an EVM minimization module 816. The EVM minimization module 816 is a processing circuit and/or set of instructions configured to generate a blind EVM function for IQ symbol data, as discussed herein, and minimize the blind EVM function to determine impairment parameters affecting the IQ symbol data to support reconstruction of ideal IQ symbol data as transmitted across a communication medium. The EVM minimization module 816 is further configured to perform method 200, in whole or in part, and/or any other method disclosed herein. In some embodiments, EVM minimization module 816 may also be implemented, in whole or in part, in the memory store 817, processor 815, user controls 813, and/or display 819. User controls 813 are coupled to the processor 815. The user controls 813 may comprise keyboard inputs, trackball inputs, mouse inputs, adjustment knobs, display adjustment controls, or any other controls employable by a user to input values and/or display the results of EVM minimization on the display 819. The display 819 may be a digital screen or a cathode ray tube based display for displaying results of EVM minimization, for example as a corrected IQ constellation, as selected impairment values, etc.

It should be noted that the present disclosure is directed, at least in part, to a computer that obtains received QAM symbols and determines impairments in order to reconstruct ideal QAM symbols by removing the effects of such impairments on the QAM symbols. Further, the computer generates a blind EVM function and minimizes the function to more accurately determine values for the impairment parameters. As such, the process of generating and minimizing the blind EVM function as discussed herein is directed to improve the functionality of the computer for such tasks. Further, the process of generating and minimizing the blind EVM function to determine impairments allows for more accurate communication over networks, such as optical networks. As such, the process of generating and minimizing the blind EVM function to determine impairments is directed to a solution that is necessarily rooted in computer technology and overcomes a problem specifically arising in the realm of computer networks.

Further, as noted above, in some cases some impairments may be solved analytically, which results in a simplification of the EVM function. The disclosure below includes a description of an alternate formulation that may be employed in conjunction with test network 100 and/or method 200.

A correlation has been established between EVM and the optical signal to noise ratio (OSNR). This correlation may be improved when constellation impairments are removed from measured symbol data prior to the evaluation of the EVM. MATLAB scripts may be employed to estimate the constellation impairments and evaluate the EVM after their removal. The constellation impairments may be evaluated by minimization of the EVM, and a MATLAB script (FindMinEVM_QPSK) may be employed to perform this minimization. This script is further extended to include polarization demultiplexing and clock recovery in the minimization (FindMinEVM_2PolQPSK_CR_ITU).

Although the EVM minimization approach to impairment evaluation is intuitively appealing and mathematically sound, implementation of EVM minimization using numerical optimization techniques is complicated. Further, the resulting processing time can be substantial. In this discussion, complexity associated with numerical optimization may be eliminated by deriving explicit and simple formulae for the constellation impairment parameters that minimize the EVM. These formulae are suitable for defining the constellation impairments. Moreover, they can be easily appended to clock recovery, polarization demultiplexing, and phase recovery algorithms. For this purpose, a MATLAB implementation of the formulae (TekCIP_QPSK) is discussed. Finally, we note that the formulae discussed obtain can be used for any transmitted constellation. They are not limited to the QPSK format.

It may be assumed that the true transmitted symbol sequences are known and the symbol values (A) at the center of the $k^{th}$ time slot are given by Equations 16-17 below:

$$A_k^{(x)} = A_{kr}^{(x)} + iA_{ki}^{(x)}$$

$$A_k^{(y)} = A_{kr}^{(y)} + iA_{ki}^{(y)} \qquad \text{Equations 16-17}$$

where the superscript denotes the polarization and the subscripts r and i denote real and imaginary parts, respectively. The ideal constellation from which the symbols above are drawn may be normalized so that the magnitude of the largest constellation point is unity. The measured symbols (Z) at the center of the kth time slot are then denoted by Equations 18-19 below:

$$Z_k^{(x)} = Z_{kr}^{(x)} + iZ_{ki}^{(x)}$$

$$Z_k^{(y)} = Z_{kr}^{(y)} + iZ_{ki}^{(y)} \quad \text{Equations 18-19}$$

In the blind case, where the true transmitted symbol sequence is not known, the true symbols are taken to be the symbols in the ideal constellation closest to the measured symbols. For the QPSK format, these closest-match symbols are given by Equations 20-21 below:

$$A_{kr}^{(x,y)} = \frac{\text{sign}(Z_{kr}^{(x,y)})}{\sqrt{2}} \quad \text{Equations 20-21}$$

$$A_{ki}^{(x,y)} = \frac{\text{sign}(Z_{ki}^{(x,y)})}{\sqrt{2}}$$

The measured symbols are related to the true symbols via Equations 22-23 below:

$$Z_k^{(x)} = e^{i\varphi^{(x)}} S_I^{(x)}(A_{kr}^{(x)} - \mu_I^{(x)}) + e^{i\theta^{(x)}} S_Q^{(x)}(A_{ki}^{(x)} - \mu_Q^{(x)})$$

$$Z_k^{(y)} = e^{i\varphi^{(y)}} S_I^{(y)}(A_{kr}^{(y)} - \mu_I^{(y)}) + e^{i\theta^{(y)}} S_Q^{(y)}(A_{ki}^{(y)} - \mu_Q^{(y)}) \quad \text{Equations 22-23}$$

where the real-valued parameters $\{S_I^{(x,y)}, S_Q^{(x,y)}, \mu_I^{(x,y)}, \mu_Q^{(x,y)}, \varphi^{(x,y)}, \theta^{(x,y)}\}$ are collectively referred to as the constellation impairment parameters. The first two parameters in this set are the I and Q scale factors, the second two parameters are DC offsets, and the last two parameters are phase angles. $\varphi^{(x,y)}$ represents an overall rotation of the x, y-constellations, while $\theta^{(x,y)} - \varphi^{(x,y)}$ represents the I-Q quadrature angle. In terms of these parameters, the following constellation impairments are defined in terms of Equations 24-26 below:

$$\text{I-Q Gain Imbalance: } G^{(x,y)} = \frac{\max(s_I^{(x,y)}, s_Q^{(x,y)})}{\min(s_I^{(x,y)}, s_Q^{(x,y)})} \quad \text{Equations 24-26}$$

$$\text{DC Offset Magnitude: } M^{(x,y)} = \sqrt{[\mu_I^{(x,y)}]^2 + [\mu_Q^{(x,y)}]^2}$$

$$\text{I-Q Quadrature Error: } \Phi^{(x,y)} = |90° - |\theta^{(x,y)} - \varphi^{(x,y)}||$$

In the blind case, the two data streams with a phase difference of approximately 90° can be identified. However, it may not be known which stream should be assigned to the I tributary and which to the Q. To eliminate this ambiguity, a max-min formulation may be employed by defining the gain imbalances in Equation 24. It should be noted that the DC offset magnitude of Equation 25 can be viewed as normalized with respect to the maximum magnitude of the ideal constellation points, which by assumption is unity.

Given the measured symbols and arbitrary values for the constellation impairment parameters, Equations 22-23 may be inverted to obtain estimates $\tilde{A}_{kr}^{(x,y)}$, $\tilde{A}_{ki}^{(x,y)}$ for the true symbols according to Equations 27-28 below:

$$\tilde{A}_{kr}^{(x,y)} = \mu_I^{(x,y)} + [Z_{kr}^{(x,y)} \sin\theta^{(x,y)} - Z_{ki}^{(x,y)} \cos\theta^{(x,y)}]/S_I^{(x,y)}\sin(\theta^{(x,y)} - \varphi^{(x,y)})$$

$$\tilde{A}_{ki}^{(x,y)} = \mu_Q^{(x,y)} + [Z_{ki}^{(x,y)} \cos\varphi^{(x,y)} - Z_{kr}^{(x,y)} \sin\varphi^{(x,y)}]/S_Q^{(x,y)}\sin(\theta^{(x,y)} - \varphi^{(x,y)}) \quad \text{Equations 27-28}$$

The EVM associated with these symbol estimates is described according to Equations 29-31 below:

$$EVM = \left[\frac{1}{2}(EVM^{(x)})^2 + \frac{1}{2}(EVM^{(y)})^2\right]^{1/2} \quad \text{Equations 29-31}$$

where $$EVM^{(x)} = \left[\frac{1}{N}\sum_{k=1}^{N}(\tilde{A}_{kr}^{(x)} - A_{kr}^{(x)})^2 + (\tilde{A}_{ki}^{(x)} - A_{ki}^{(x)})^2\right]^{1/2}$$

$$EVM^{(y)} = \left[\frac{1}{N}\sum_{k=1}^{N}(\tilde{A}_{kr}^{(y)} - A_{kr}^{(y)})^2 + (\tilde{A}_{ki}^{(y)} - A_{ki}^{(y)})^2\right]^{1/2}$$

The constellation impairment parameters are evaluated by finding the values that minimize the EVM, or equivalently, the square of the EVM. Because $EVM^{(x)}$ depends only on the x-polarization parameters, and $EVM^{(y)}$ depends only on the y-polarization parameters, the former is evaluated by minimizing the square of $EVM^{(x)}$ and the latter is evaluated by minimizing the square of $EVM^{(y)}$.

A detailed derivation of the explicit formulae for the constellation impairment parameters of the x-polarization are shown below. The formulae for the parameters of the y-polarization are obtained in an analogous manner. With the understanding that the Equations below relate only to the x-polarization components, the x superscript is removed on all parameters and symbols for clarity. The constellation impairment parameters for the x-polarization are obtained by minimizing the square of $EVM^{(x)}$, given in Equation 30. This square is denoted according to Equation 32 below:

$$F(S_I, S_Q, \mu_I, \mu_Q, \varphi, \theta) = \frac{1}{N}\sum_{k=1}^{N}\left[(\tilde{A}_{kr} - A_{kr})^2 + (\tilde{A}_{ki} - A_{ki})^2\right] \quad \text{Equation 32}$$

For the minimizing parameters, the gradient of F vanishes as shown in Equations 33-38 below:

$$\frac{\partial F}{\partial \mu_I} = \frac{2}{N}\sum_{k=1}^{N}(\tilde{A}_{kr} - A_{kr})\frac{\partial \tilde{A}_{kr}}{\partial \mu_I} = 0 \quad \text{Equations 33-38}$$

$$\frac{\partial F}{\partial \mu_Q} = \frac{2}{N}\sum_{k=1}^{N}(\tilde{A}_{ki} - A_{ki})\frac{\partial \tilde{A}_{ki}}{\partial \mu_Q} = 0$$

$$\frac{\partial F}{\partial S_I} = \frac{2}{N}\sum_{k=1}^{N}(\tilde{A}_{kr} - A_{kr})\frac{\partial \tilde{A}_{kr}}{\partial S_I} = 0$$

$$\frac{\partial F}{\partial S_Q} = \frac{2}{N}\sum_{k=1}^{N}(\tilde{A}_{ki} - A_{ki})\frac{\partial \tilde{A}_{ki}}{\partial S_Q} = 0$$

$$\frac{\partial F}{\partial \theta} = \frac{2}{N}\sum_{k=1}^{N}\left[(\tilde{A}_{kr} - A_{kr})\frac{\partial \tilde{A}_{kr}}{\partial \theta} + (\tilde{A}_{ki} - A_{ki})\frac{\partial \tilde{A}_{ki}}{\partial \theta}\right] = 0$$

$$\frac{\partial F}{\partial \varphi} = \frac{2}{N}\sum_{k=1}^{N}\left[(\tilde{A}_{kr} - A_{kr})\frac{\partial \tilde{A}_{kr}}{\partial \varphi} + (\tilde{A}_{ki} - A_{ki})\frac{\partial \tilde{A}_{ki}}{\partial \varphi}\right] = 0$$

Partial derivatives of the symbol estimates may then be obtained with respect to the impairment parameters from Equations 27-28. The impairment parameters may be substituted into Equations 33-38 and multiplied by N/2, which results in Equations 39-44 below:

$$\sum_{k=1}^{N} (\tilde{A}_{kr} - A_{kr}) = 0 \quad \text{Equations 39-44}$$

$$\sum_{k=1}^{N} (\tilde{A}_{ki} - A_{ki}) = 0$$

$$-\frac{1}{S_I^2 \sin(\theta - \varphi)} \sum_{k=1}^{N} (\tilde{A}_{kr} - A_{kr})(Z_{kr}\sin\theta - Z_{ki}\cos\theta) = 0$$

$$-\frac{1}{S_Q^2 \sin(\theta - \varphi)} \sum_{k=1}^{N} (\tilde{A}_{ki} - A_{ki})(Z_{ki}\cos\varphi - Z_{kr}\sin\varphi) = 0$$

$$\frac{1}{S_I \sin^2(\theta - \varphi)} \sum_{k=1}^{N} (\tilde{A}_{kr} - A_{kr})(Z_{ki}\cos\varphi - Z_{kr}\sin\varphi) +$$

$$\frac{\cos(\theta - \varphi)}{S_Q \sin^2(\theta - \varphi)} \sum_{k=1}^{N} (\tilde{A}_{ki} - A_{ki})(Z_{kr}\sin\varphi - Z_{ki}\cos\varphi) = 0$$

$$\frac{\cos(\theta - \varphi)}{S_I \sin^2(\theta - \varphi)} \sum_{k=1}^{N} (\tilde{A}_{kr} - A_{kr})(Z_{kr}\sin\theta - Z_{ki}\cos\theta) +$$

$$\frac{1}{S_Q \sin^2(\theta - \varphi)} \sum_{k=1}^{N} (\tilde{A}_{ki} - A_{ki})(Z_{ki}\cos\theta - Z_{kr}\sin\theta) = 0$$

Equation 42 shows that the second term on the left-hand side of Equation 43 vanishes. Similarly, Equation 41 shows that the first term on the left-hand side of Equation 44 vanishes. Equation 41 may be multiplied by $-S_I^2 \sin(\theta-\varphi)$, Equation 42 by $-S_Q^2 \sin(\theta-\varphi)$, Equation 43 by $S_I \sin^2(\theta-\varphi)$, and Equation 44 by $S_Q \sin^2(\theta-\varphi)$. This may result in the simplified Equations 45-50 below:

$$\sum_{k=1}^{N} (\tilde{A}_{kr} - A_{kr}) = 0 \quad \text{Equations 45-50}$$

$$\sum_{k=1}^{N} (\tilde{A}_{ki} - A_{ki}) = 0$$

$$\sum_{k=1}^{N} (\tilde{A}_{kr} - A_{kr})(Z_{kr}\sin\theta - Z_{ki}\cos\theta) = 0$$

$$\sum_{k=1}^{N} (\tilde{A}_{ki} - A_{ki})(Z_{ki}\cos\varphi - Z_{kr}\sin\varphi) = 0$$

$$\sum_{k=1}^{N} (\tilde{A}_{kr} - A_{kr})(Z_{ki}\cos\varphi - Z_{kr}\sin\varphi) = 0$$

$$\sum_{k=1}^{N} (\tilde{A}_{ki} - A_{ki})(Z_{ki}\cos\theta - Z_{kr}\sin\theta) = 0$$

Parameters P and R may then be defined according to Equations 51-52 below:

$$P = \frac{1}{S_I \sin(\theta - \varphi)} \quad \text{Equations 51-52}$$

$$R = \frac{1}{S_Q \sin(\theta - \varphi)}$$

By substituting Equations 27-28 into Equations 45-50, by employing the parameters defined in Equations 51-52, and by re-arranging terms, Equations 53-58 are obtained:

$$\sum_{k=1}^{N} [\mu_I + P(Z_{kr}\sin\theta - Z_{ki}\cos\theta)] = \sum_{k=1}^{N} A_{kr} \quad \text{Equations 53-58}$$

$$\sum_{k=1}^{N} [\mu_Q + R(Z_{ki}\cos\varphi - Z_{kr}\sin\varphi)] = \sum_{k=1}^{N} A_{ki}$$

$$\sum_{k=1}^{N} (\mu_I + P(Z_{kr}\sin\theta - Z_{ki}\cos\theta) - A_{kr})(Z_{kr}\sin\theta - Z_{ki}\cos\theta) = 0$$

$$\sum_{k=1}^{N} (\mu_Q + R(Z_{ki}\cos\varphi - Z_{kr}\sin\varphi) - A_{ki})(Z_{ki}\cos\varphi - Z_{kr}\sin\varphi) = 0$$

$$\sum_{k=1}^{N} (\mu_I + P(Z_{kr}\sin\theta - Z_{ki}\cos\theta) - A_{kr})(Z_{ki}\cos\varphi - Z_{kr}\sin\varphi) = 0$$

$$\sum_{k=1}^{N} (\mu_Q + R(Z_{ki}\cos\varphi - Z_{kr}\sin\varphi) - A_{ki})(Z_{ki}\cos\theta - Z_{kr}\sin\theta) = 0$$

A simpler notation is then introduced for the various summations that appear in Equations 53-58. These summations depend only on the known symbol information. Specifically, such change in notation results in Equations 59-69 below:

$$M_1 = \sum_{k=1}^{N} Z_{kr} \quad \text{Equations 59-69}$$

$$M_2 = \sum_{k=1}^{N} Z_{ki}$$

$$M_3 = \sum_{k=1}^{N} A_{kr}$$

$$M_4 = \sum_{k=1}^{N} Z_{kr}^2$$

$$M_5 = \sum_{k=1}^{N} Z_{kr} Z_{ki}$$

$$M_6 = \sum_{k=1}^{N} Z_{ki}^2$$

$$M_7 = \sum_{k=1}^{N} A_{kr} Z_{kr}$$

$$M_8 = \sum_{k=1}^{N} A_{kr} Z_{ki}$$

$$M_9 = \sum_{k=1}^{N} A_{ki}$$

-continued $$M_{10} = \sum_{k=1}^{N} A_{ki} Z_{ki}$$

$$M_{11} = \sum_{k=1}^{N} A_{ki} Z_{kr}$$

$\sin\theta[M_3(M_2 M_4 - M_1 M_5) + M_1(M_1 M_8 - M_2 M_7) + N(M_7 M_5 - M_8 M_4)] + \cos\theta[M_3(M_1 M_6 - M_2 M_5) + M_2(M_2 M_7 + N(M_5 M_8 - M_7 M_6)] = 0$ $\sin\varphi[M_9 (M_1 M_5 - M_2 M_4) + M_1(M_2 M_{11} - M_1 M_{10}) + N(M_4 M_{10} - M_5 M_{11})] + \cos\varphi[M_9 (M_2 M_5 - M_1 M_6) + M_2(M_1 M_{10} - M_2 M_{11}) + N(M_{11} M_6 - M_{10} M_5)] = 0$   Equations 80-81

Equations 80-81 may then be solved for $\theta$ and $\varphi$, respectively, resulting in Equations 82-83:

$$\theta = \tan^{-1}\left\{\frac{M_3(M_2 M_5 - M_1 M_6) + M_2(M_1 M_8 - M_2 M_7) + N(M_7 M_6 - M_5 M_8)}{M_3(M_2 M_4 - M_1 M_5) + M_1(M_1 M_8 - M_2 M_7) + N(M_7 M_5 - M_8 M_4)}\right\}$$   Equations 82-83

$$\varphi = \tan^{-1}\left\{\frac{M_9(M_1 M_6 - M_2 M_5) + M_2(M_2 M_{11} - M_1 M_{10}) + N(M_{10} M_5 - M_{11} M_6)}{M_9(M_1 M_5 - M_2 M_4) + M_1(M_2 M_{11} - M_1 M_{10}) + N(M_4 M_{10} - M_5 M_{11})}\right\}$$

Finally, substituting Equations 59-69 into Equations 53-58 results in Equations 70-75 below:

$N\mu_I - P(M_2 \cos\theta - M_1 \sin\theta) = M_3$ $N\mu_Q R(M_2 \cos\varphi - M_1 \sin\varphi) = M_9$ $\mu_I(M_1 \sin\theta - M_2 \cos\theta) + P(M_4 \sin^2\theta - 2M_5 \sin\theta \cos\theta + M_6 \cos^2\theta) = M_7 \sin\theta - M_8 \cos\theta$ $\mu_Q(M_2 \cos\varphi - M_1 \sin\varphi) + R(M_4 \sin^2\varphi - 2M_5 \sin\varphi \cos\varphi + M_6 \cos^2\varphi) = M_{10} \cos\varphi - M_{11} \sin\varphi$ $\mu_I(M_2 \cos\varphi - M_1 \sin\varphi) - P(M_4 \sin\theta \sin\varphi - M_5 \sin(\theta+\varphi) + M_6 \cos\theta \cos\varphi) + M_7 \sin\varphi - M_8 \cos\varphi = 0$ $\mu_Q(M_2 \cos\theta - M_1 \sin\theta) + R(M_4 \sin\theta \sin\varphi - M_5 \sin(\theta+\varphi) + M_6 \cos\theta \cos\varphi) + M_{11} \sin\theta - M_{10} \cos\theta = 0$   Equations 70-75

Thus, the vanishing gradient conditions represented by Equations 33-38 are equivalent to the simpler Equations 70-75. As such, Equations 70-75 can be solved for minimization of impairment parameters. Equations 70 and 72 are linear in the parameters $\mu_I$ and P. Consequently, they can be solved to obtain $\mu_I$ and P as functions of $\theta$. Similarly, Equations 71 and 73 are linear in $\mu_Q$ and R, and they can be solved to obtain these parameters as functions of $\varphi$. The determinants of the linear systems may be assumed to be are non-zero, resulting in Equations 76-79 below:

$$\mu_I = \frac{M_3(M_4 \sin^2\theta - 2M_5 \sin\theta\cos\theta + M_6 \cos^2\theta) + (M_7 \sin\theta - M_8 \cos\theta)(M_2 \cos\theta - M_1 \sin\theta)}{N(M_4 \sin^2\theta - 2M_5 \sin\theta\cos\theta + M_6 \cos^2\theta) - (M_2 \cos\theta - M_1 \sin\theta)^2}$$   Equations 76-79

$$P = \frac{N(M_7 \sin\theta - M_8 \cos\theta) + M_3(M_2 \cos\theta - M_1 \sin\theta)}{N(M_4 \sin^2\theta - 2M_5 \sin\theta\cos\theta + M_6 \cos^2\theta) - (M_2 \cos\theta - M_1 \sin\theta)^2}$$

$$\mu_Q = \frac{M_9(M_4 \sin^2\varphi - 2M_5 \sin\varphi\cos\varphi + M_6 \cos^2\varphi) + (M_{11} \sin\varphi - M_{10} \cos\varphi)(M_2 \cos\varphi - M_1 \sin\varphi)}{N(M_4 \sin^2\varphi - 2M_5 \sin\varphi\cos\varphi + M_6 \cos^2\varphi) - (M_2 \cos\varphi - M_1 \sin\varphi)^2}$$

$$R = \frac{N(M_{10} \cos\varphi - M_{11} \sin\varphi) + M_9(M_2 \cos\varphi - M_1 \sin\varphi)}{N(M_4 \sin^2\varphi - 2M_5 \sin\varphi\cos\varphi + M_6 \cos^2\varphi) - (M_2 \cos\varphi - M_1 \sin\varphi)^2}$$

Equations 76-79 may then be substituted into the remaining Equations 74-75 to obtain two equations for the two remaining parameters $\varphi$ and $\theta$. After lengthy algebraic and trigonometric simplifications, Equations 74 becomes Equation 80, and Equation 75 becomes Equation 81, respectively:

With knowledge of $\theta$ and $\varphi$, $\mu_I$ and P may be evaluated by employing Equations 76 and 77, respectively. Further, $\mu_Q$ and R may be evaluated by employing Equations 78 and 79, respectively. Finally, from Equations 51-52 and knowledge of $\theta$ and $\varphi$, Equations 85-86 may be obtained:

$$S_I = \frac{1}{P\sin(\theta - \varphi)}$$   Equations 85-86

$$S_Q = \frac{1}{R\sin(\theta - \varphi)}$$

Equations 76-79, 82-83, and 85-86 may then be employed as the minimizing constellation impairment parameters. Accordingly, such parameters may be implemented in the MATLAB function TekCIP_QPSK (e.g. in block 205 of method 200). The corrected symbols used to evaluate the EVM may be obtained from these parameters using Equations 27-28. The impairments may be obtained from Equations 24-26. These equations may be used on their own to obtain the impairments in Equations 22-23, or they can be in used to simplify a more general EVM minimization process that includes other parameters which cannot be evaluated analytically. These parameters include, for example, the heterodyne frequency parameter, $\psi$, or the parameters that appear in Equations 1-3.

Examples of the disclosure may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, RAM, etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 includes a test and measurement system comprising: a data store including a data description of at least one received in-phase (I) quadrature (Q) symbol, the received IQ symbol received from a transmitter associated with impairments and the received IQ symbol modified from a corresponding ideal IQ symbol by the impairments; and a computer processor coupled to the data store and configured to: generate an Error-Vector Magnitude (EVM) function that describes a difference between the received IQ symbol and the ideal IQ symbol in terms of a plurality of impairment parameters indicating the impairments; and determine values for the impairment parameters that quantify the impairments, the values determined by selection of values for the impairment parameters that minimize the EVM function.

Example 2 includes the test and measurement system of Example 1, wherein the EVM function is generated as a blind EVM function without information indicating values of the ideal IQ symbol.

Example 3 includes the test and measurement system of Examples 1-2, wherein at least one impairment value is determined via an analytical computation to simplify minimization of the EVM function via a numerical computation.

Example 4 includes the test and measurement system of Examples 1-3, wherein the EVM function is generated according to:

$$EVM_B^{(x,y)} = \left\{ \frac{1}{N} \sum_{k=1}^{N} \left[ \min_{1 \leq j \leq M_R} \left( |I_k^{(x,y)}| - a_j \right)^2 + \min_{1 \leq m \leq M_R} \left( |Q_k^{(x,y)}| - a_m \right)^2 \right] \right\}^{1/2},$$

where $EVM_B^{(x,y)}$ indicates the difference between the received IQ symbol and the ideal IQ symbol for x polarizations and y polarizations, N indicates a number of IQ symbols considered, k indicates a time slot of the received IQ symbol, $a_j$ is a possible value for an I portion of a constellation, $Q_k^{(x,y)}$ is a Q portion of the ideal IQ symbol for x polarizations and y polarizations, and $a_m$ is a possible value for a Q portion of a constellation.

Example 5 includes the test and measurement system of Example 4, wherein the I portion of the ideal IQ symbol for x polarizations and y polarizations is further determined according to:

$$I_k^{(x,y)} = \mu_I^{(x,y)} - (A_k^{(x,y)} \cos \tau + B_k^{(x,y)} \sin \tau)/(S_I^{(x,y)} \sin \theta^{(x,y)}),$$

where $\mu_I^{(x,y)}$ is a direct current (DC) offset of an I portion of the received IQ symbol for x polarizations and y polarizations, $A_k^{(x,y)}$ and $B_k^{(x,y)}$ describe correlations between the impairment parameters, $\tau$ indicates a polarization rotation impairment caused by a communication medium, $S_I^{(x,y)}$ indicates I gain of the received IQ symbol, and $\theta$ indicates an IQ phase angle of the received IQ symbol.

Example 6 includes the test and measurement system of Example 5, wherein the correlations between the impairment parameters are further described according to:

$$A_k^{(x,y)} = Z_{kr}^{(x,y)} \sin\{(k-1)\psi + \phi \mp \eta_1 - \theta^{(x,y)}\} + Z_{ki}^{(x,y)} \cos\{(k-1)\psi + \phi \mp \eta_1 - \theta^{(x,y)}\}, \text{ and}$$

$$B_k^{(x,y)} = \pm Z_{kr}^{(y,x)} \sin\{(k-1)\psi + \phi \pm \eta_2 - \theta^{(x,y)}\} \pm Z_{ki}^{(y,x)} \cos\{(k-1)\psi + \phi \pm \eta_2 - \theta^{(x,y)}\},$$

where $Z_{kr}^{(x,y)}$ indicates a real part of received symbol data, $Z_{ki}^{(x,y)}$ indicates an imaginary part of the received symbol data, $\psi$ indicates a heterodyne frequency parameter employed to determine a heterodyne frequency impairment (v), $\phi$ indicates an optical phase impairment, and $\eta_1$ and $\eta_2$ indicate polarization rotation impairments caused by the communication medium.

Example 7 includes the test and measurement system of Example 4, wherein the Q portion of the ideal IQ symbol for x polarizations and y polarizations is further determined according to:

$$Q_k^{(x,y)} = \mu_Q^{(x,y)} + (C_k^{(x,y)} \cos \tau + D_k^{(x,y)} \sin \tau)/(S_Q^{(x,y)} \sin \theta^{(x,y)}),$$

where $\mu_Q^{(x,y)}$ is a direct current (DC) offset of a Q portion of the received IQ symbol for x polarizations and y polarizations, $C_k^{(x,y)}$ and $D_k^{(x,y)}$ describe correlations between the impairment parameters, $\tau$ indicates polarization rotation impairment caused by a communication medium, $S_Q^{(x,y)}$ indicates Q gain of the received IQ symbol, and $\theta$ indicates an IQ phase angle of the received IQ symbol.

Example 8 includes the test and measurement system of Example 7, wherein the correlations between the impairment parameters are further described according to:

$$C_k^{(x,y)} = Z_{kr}^{(x,y)} \sin\{(k-1)\psi + \phi \mp \eta_1\} + Z_{ki}^{(x,y)} \cos\{(k-1)\psi + \phi \mp \eta_1\}, \text{ and}$$

$$D_k^{(x,y)} = \pm Z_{kr}^{(y,x)} \sin\{(k-1)\psi + \phi \pm \eta_2\} \pm Z_{ki}^{(y,x)} \cos\{(k-1)\psi + \phi \pm \eta_2\},$$

where $Z_{kr}^{(x,y)}$ indicates a real part of received symbol data, $Z_{ki}^{(x,y)}$ indicates an imaginary part of the received symbol data, $\psi$ indicates a heterodyne frequency parameter employed to determine a heterodyne frequency impairment (v), $\phi$ indicates an optical phase impairment, and $\eta_1$ and $\eta_2$ indicate polarization rotation impairments caused by the medium.

Example 9 includes the test and measurement system of Examples 1-8, wherein the received IQ symbol is further received via a communication medium including an optical fiber, and wherein the impairments determined by minimization of the EVM function are further associated with the communication medium.

Example 10 the test and measurement system of Examples 1-9, wherein selecting values for the impairment parameters that minimize the EVM function includes employing a minimization procedure that minimizes the EVM function while avoiding local minima.

Example 11 includes a method comprising: obtaining at least one received in-phase (I) quadrature (Q) symbol, the received IQ symbol received from a transmitter associated with impairments and the received IQ symbol modified from a corresponding ideal IQ symbol by the impairments; generating an Error-Vector Magnitude (EVM) function that describes a difference between the received IQ symbol and the ideal IQ symbol in terms of a plurality of impairment parameters indicating the impairments; and determining values for the impairment parameters that quantify the impairments, the values determined by selecting values for the impairment parameters that minimize the EVM function.

Example 12 includes the method of Example 11, wherein the EVM function is generated as a blind EVM function without information indicating values of the ideal IQ symbol.

Example 13 includes the method of Examples 11-12, wherein values for the impairment parameters are determined concurrently and not sequentially.

Example 14 includes the method of Examples 11-13, wherein at least one impairment value is determined via an analytical computation to simplify the EVM function prior to minimizing the EVM function via a numerical computation.

Example 15 includes the method of Examples 11-14, wherein selecting values for the impairment parameters that minimize the EVM function includes employing a generalized simulated annealing (GSA) minimization procedure to minimize the EVM function while avoiding local minima.

Example 16 includes a computer readable storage medium having instructions stored thereon that, when executed by a processor of a test and measurement system, cause the test and measurement system to perform the steps of: obtaining at least one received in-phase (I) quadrature (Q) symbol, the received IQ symbol received from a transmitter associated with impairments and the received IQ symbol modified from a corresponding ideal IQ symbol by the impairments; generating an Error-Vector Magnitude (EVM) function that describes a difference between the received IQ symbol and the ideal IQ symbol in terms of a plurality of impairment parameters indicating the impairments; and determining values for the impairment parameters that quantify the impairments, the values determined by selecting values for the impairment parameters that minimize the EVM function.

Example 17 includes the computer readable storage medium of Example 16, wherein the EVM function is generated as a blind EVM function without information indicating values of the ideal IQ symbol.

Example 18 includes the computer readable storage medium of Examples 16-17, wherein values for the impairment parameters are determined concurrently and not sequentially.

Example 19 includes the computer readable storage medium of Examples 16-18, wherein at least one impairment value is determined via an analytical computation to simplify the EVM function prior to minimizing the EVM function via a numerical computation.

Example 20 includes the computer readable storage medium of Examples 16-19, wherein selecting values for the impairment parameters that minimize the EVM function includes employing a generalized simulated annealing (GSA) minimization procedure to minimize the EVM function while avoiding local minima.

The previously described examples of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A test and measurement system comprising:
a data store including a data description of at least one received in-phase (I) quadrature (Q) symbol, the received IQ symbol received from a transmitter associated with impairments and the received IQ symbol modified from a corresponding ideal IQ symbol by the impairments; and
a computer processor coupled to the data store and configured to:
generate an Error-Vector Magnitude (EVM) function that describes a difference between the received IQ symbol and the ideal IQ symbol in terms of a plurality of impairment parameters indicating the impairments; and
determine values for the impairment parameters that quantify the impairments, the values determined by selection of values for the impairment parameters that minimize the EVM function.

2. The test and measurement system of claim 1, wherein the EVM function is generated as a blind EVM function without information indicating values of the ideal IQ symbol.

3. The test and measurement system of claim 2, wherein at least one impairment value is determined via an analytical computation to simplify minimization of the EVM function via a numerical computation.

4. The test and measurement system of claim 2, wherein the EVM function is generated according to:

$$EVM_B^{(x,y)} = \left\{ \frac{1}{N} \sum_{k=1}^{N} \left[ \min_{1 \leq j \leq M_R} \left( |I_k^{(x,y)}| - a_j \right)^2 + \min_{1 \leq m \leq M_R} \left( |Q_k^{(x,y)}| - a_m \right)^2 \right] \right\}^{1/2},$$

where $EVM_B^{(x,y)}$ indicates the difference between the received IQ symbol and the ideal IQ symbol for x polarizations and y polarizations, N indicates a number of IQ symbols considered, k indicates a time slot of the received IQ symbol, $a_j$ is a possible value for an I portion of a constellation, $Q_k^{(x,y)}$ is a Q portion of the ideal IQ symbol for x polarizations and y polarizations, and $a_m$ is a possible value for a Q portion of a constellation.

5. The test and measurement system of claim 4, wherein the I portion of the ideal IQ symbol for x polarizations and y polarizations is further determined according to:

$$I_k^{(x,y)} = \mu_I^{(x,y)} - (A_k^{(x,y)} \cos \tau + B_k^{(x,y)} \sin \tau)/(S_I^{(x,y)} \sin \theta^{(x,y)}),$$

where $\mu_I^{(x,y)}$ is a direct current (DC) offset of an I portion of the received IQ symbol for x polarizations and y polarizations, $A_k^{(x,y)}$ and $B_k^{(x,y)}$ describe correlations between the impairment parameters, τ indicates a polarization rotation impairment caused by a communication medium, $S_I^{(x,y)}$ indicates I gain of the received IQ symbol, and θ indicates an IQ phase angle of the received IQ symbol.

6. The test and measurement system of claim 5, wherein the correlations between the impairment parameters are further described according to:

$$A_k^{(x,y)} = Z_{kr}^{(x,y)} \sin\{(k-1)\psi + \phi m \eta_1 - \theta^{(x,y)}\} + Z_{ki}^{(x,y)} \cos\{(k-1)\psi + \phi m \eta_1 - \theta^{(x,y)}\}, \text{and}$$

$$B_k^{(x,y)} = \pm Z_{kr}^{(y,x)} \sin\{(k-1)\psi + \phi \pm \eta_2 - \theta^{(x,y)}\} \pm Z_{ki}^{(y,x)} \cos\{(k-1)\psi + \phi \pm \eta_2 - \theta^{(x,y)}\},$$

where $Z_{kr}^{(x,y)}$ indicates a real part of received symbol data, $Z_{ki}^{(x,y)}$ indicates an imaginary part of the received symbol data, ψ indicates a heterodyne frequency parameter employed to determine a heterodyne frequency impairment (v), φ indicates an optical phase impairment, and η1 and η2 indicate polarization rotation impairments caused by the communication medium.

7. The test and measurement system of claim 4, wherein the Q portion of the ideal IQ symbol for x polarizations and y polarizations is further determined according to:

$$Q_k^{(x,y)} = \mu_Q^{(x,y)} + (C_k^{(x,y)} \cos \tau + D_k^{(x,y)} \sin \tau)/(S_Q^{(x,y)} \sin \theta^{(x,y)}),$$

where $\mu_Q^{(x,y)}$ is a direct current (DC) offset of a Q portion of the received IQ symbol for x polarizations and y polarizations, $C_k^{(x,y)}$ and $D_k^{(x,y)}$ describe correlations between the impairment parameters, τ indicates polarization rotation impairment caused by a communication medium, $S_Q^{(x,y)}$ indicates Q gain of the received IQ symbol, and θ indicates an IQ phase angle of the received IQ symbol.

8. The test and measurement system of claim 7, wherein the correlations between the impairment parameters are further described according to:

$$C_k^{(x,y)} = Z_{kr}^{(x,y)} \sin\{(k-1)\psi + \phi m \eta_1\} + Z_{ki}^{(x,y)} \cos\{(k-1)\psi + \phi m \eta_1\}, \text{and}$$

$$D_k^{(x,y)} = \pm Z_{kr}^{(y,x)} \sin\{(k-1)\psi + \phi \pm \eta_2\} \pm Z_{ki}^{(y,x)} \cos\{(k-1)\psi + \phi \pm \eta_2\},$$

where $Z_{kr}^{(x,y)}$ indicates a real part of received symbol data, $Z_{ki}^{(x,y)}$ indicates an imaginary part of the received symbol data, ψ indicates a heterodyne frequency parameter employed to determine a heterodyne frequency impairment (v), φ indicates an optical phase impairment, and η1 and η2 indicate polarization rotation impairments caused by the medium.

9. The test and measurement system of claim 1, wherein the received IQ symbol is further received via a communication medium including an optical fiber, and wherein the impairments determined by minimization of the EVM function are further associated with the communication medium.

10. The test and measurement system of claim 1, wherein selecting values for the impairment parameters that minimize the EVM function includes employing a minimization procedure that minimizes the EVM function while avoiding local minima.

11. A method comprising:
obtaining at least one received in-phase (I) quadrature (Q) symbol, the received IQ symbol received from a transmitter associated with impairments and the received IQ symbol modified from a corresponding ideal IQ symbol by the impairments;

generating an Error-Vector Magnitude (EVM) function that describes a difference between the received IQ symbol and the ideal IQ symbol in terms of a plurality of impairment parameters indicating the impairments; and determining values for the impairment parameters that quantify the impairments, the values determined by selecting values for the impairment parameters that minimize the EVM function.

12. The method of claim 11, wherein the EVM function is generated as a blind EVM function without information indicating values of the ideal IQ symbol.

13. The method of claim 11, wherein values for the impairment parameters are determined concurrently and not sequentially.

14. The method of claim 11, wherein at least one impairment value is determined via an analytical computation to simplify the EVM function prior to minimizing the EVM function via a numerical computation.

15. The method of claim 11, wherein selecting values for the impairment parameters that minimize the EVM function includes employing a generalized simulated annealing (GSA) minimization procedure to minimize the EVM function while avoiding local minima.

16. A non-transitory computer readable storage medium having instructions stored thereon that, when executed by a processor of a test and measurement system, cause the test and measurement system to perform the steps of:

obtaining at least one received in-phase (I) quadrature (Q) symbol, the received IQ symbol received from a transmitter associated with impairments and the received IQ symbol modified from a corresponding ideal IQ symbol by the impairments;

generating an Error-Vector Magnitude (EVM) function that describes a difference between the received IQ symbol and the ideal IQ symbol in terms of a plurality of impairment parameters indicating the impairments; and determining values for the impairment parameters that quantify the impairments, the values determined by selecting values for the impairment parameters that minimize the EVM function.

17. The non-transitory computer readable storage medium of claim 16, wherein the EVM function is generated as a blind EVM function without information indicating values of the ideal IQ symbol.

18. The non-transitory computer readable storage medium of claim 16, wherein values for the impairment parameters are determined concurrently and not sequentially.

19. The non-transitory computer readable storage medium of claim 16, wherein at least one impairment value is determined via an analytical computation to simplify the EVM function prior to minimizing the EVM function via a numerical computation.

20. The non-transitory computer readable storage medium of claim 16, wherein selecting values for the impairment parameters that minimize the EVM function includes employing a generalized simulated annealing (GSA) minimization procedure to minimize the EVM function while avoiding local minima.

* * * * *